Jan. 8, 1963  G. B. LUHMAN, JR  3,072,284
VENT
Filed June 9, 1960
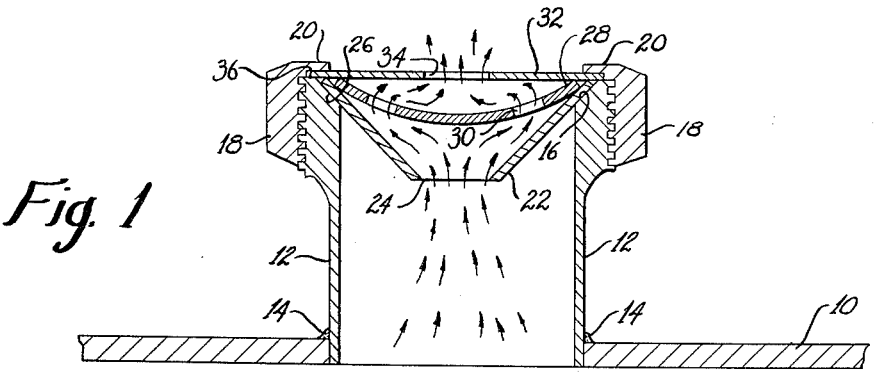
Fig. 1
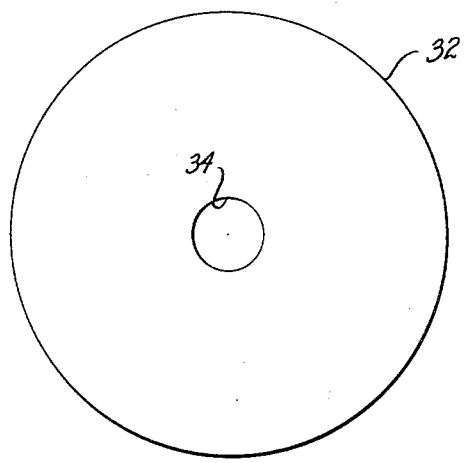
Fig. 2
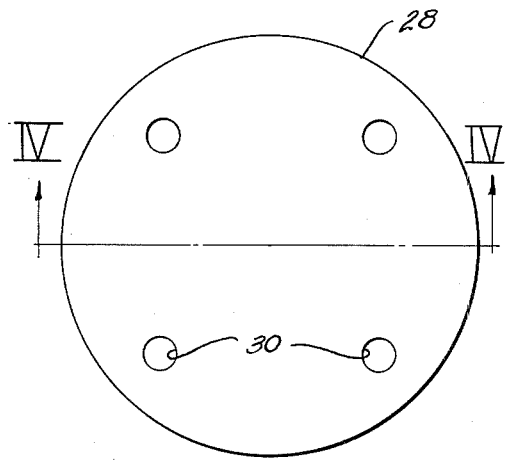
Fig. 3
Fig. 5
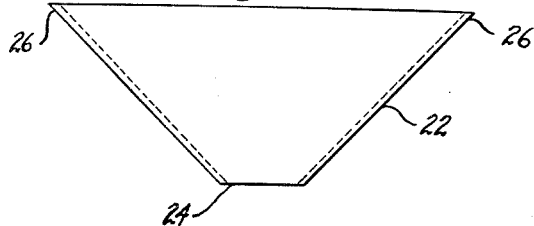
Fig. 4
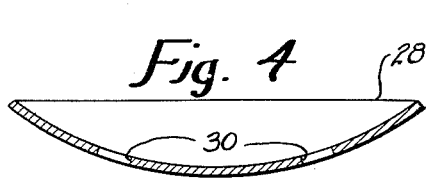
INVENTOR.
GEORGE B. LUHMAN JR.
BY
Andrus & Starke
Attorneys

United States Patent Office 3,072,284
Patented Jan. 8, 1963

3,072,284
VENT
George B. Luhman, Jr., Milwaukee, Wis., assignor to Dairy Equipment Company, Madison, Wis., a corporation of Wisconsin
Filed June 9, 1960, Ser. No. 35,084
4 Claims. (Cl. 220—44)

This invention relates to a housing vent to be used in connection with a tank such as is employed in the transportation of liquids. The vehicular tanks to which the vent of the invention is applied are generally of substantial capacity such as those used in connection with the transportation of chemicals, gasoline and milk.

A principal object of the invention is to provide a vent for a tank housing which prevents a pressure or vacuum build-up in the tank while the same is being loaded or unloaded. Generally, the vehicular tanks with which the vent of the invention is particularly adaptable are tanks which are both filled and drained from the bottom.

A further object of the invention is to provide a vent for a vehicular tank which prohibits the splashing out of any liquid from the tank while the same is in transport and being subjected to the unevenness of certain roads and repeated starting and stopping of the vehicle.

Another object of the invention is to provide a vent for a vehicular tank which is sanitary, which lends itself to quick and easy cleaning, and which is comprised of no moving parts while it is functioning.

A still further object is to provide a vent which is not prone to freeze in cold weather or to become sticky in hot weather, and a vent which will not pick up and retain odors from the liquid being transported. It is known that vents fabricated from rubber will freeze upon occasion and when this occurs, will blow out if sufficient pressure is exerted against the vent. Similarly, a vent made of plastic is susceptible to brittleness from extremely cold weather or to pliability from excessive heat.

A further object of the invention is to provide a vent for a vehicular housing which is preferably made of metal, which is relatively inexpensive to fabricate, which lends itself admirably to washing and sanitizing, the latter being most desirable and, in fact, necessary in the handling of liquid food products, such as milk, and which is substantially foolproof from likelihood of damage due to use.

Essentially, the vent of the invention consists of a minimum number of elements which when assembled in operating condition provide a maze or labyrinth of parts having a plurality of tortuous paths for the ingress and egress of air therethrough and through which it is practically impossible for liquids to splash outwardly from the tank to which the vent is secured. This is accomplished by disposing an apertured, generally curved disc between an apertured diffuser cone and an apertured plate, and in which the apertures in the cone and plate are substantially of the same cross sectional area and in which the total cross sectional area of the plurality of apertures in the intermediately disposed disc is substantially equal to the cross sectional area of the aperture in either of the other two members. The aforementioned cone, disc and plate are locked together against a bearing surface or shoulder of a ferrule which is secured at a suitable position in the top of the vehicular tank thereby providing a unitary structure in which there are no moving parts.

Having briefly set forth the essential parts of the structure of the invention, a reference to the drawings and a detailed description of the members shown therein follows, in which:

FIG. 1 is a cross sectional vertical view of a vent embodying the invention and secured to the manhole cover disposed at the top of a vehicular tank;

FIG. 2 is a plan view of an apertured plate disposed in the top of the vent;

FIG. 3 is a plan view of a curved disc having a plurality of equally spaced and equally sized apertures disposed therein;

FIG. 4 is a sectional view taken on line IV—IV of FIG. 3; and

FIG. 5 is an elevational view of an apertured diffuser cone forming a part of the structure of the invention.

With reference to the drawing and particularly FIG. 1, numeral 10 indicates a manhole cover generally hingedly engaged at the top of a tank body. A body or ferrule 12 of any material, preferably stainless steel is disposed through an opening in the top of the manhole cover with the inner end thereof secured to the manhole cover as by welding 14.

The ferrule or body 12 is cylindrical and extends upwardly in a vertical position from the manhole cover and at the inner edge of the top thereof, is provided with an angular circumferential bearing surface 16. The outer end of the ferrule is screw threaded to receive a locking nut 18 whose uppermost end is flanged radially inwardly to form a locking shoulder 20.

A conical shaped diffuser 22 having a central aperture 24 is disposed within the ferrule with its aperture pointing downwardly toward the opening in the manhole cover and with its upper outer circumferential surface 26 adapted to be positioned and bearing against the inclined surface 16 of the ferrule or body.

The diameter of aperture 24 may be of any suitable size but is chosen so that its cross sectional area will be equal to the cross sectional area of an aperture of another member of the structure and also to the combined cross sectional area of plurality of apertures of a third member, both of which will now be described.

Immediately adjacent and disposed against the inner surface of cone 22 is a curved disc 28 which is provided with a plurality of equality radially spaced apertures 28. The diameter of the plurality of apertures 28 is such that the combined cross sectional area of the apertures is substantially the same as the cross sectional area of the aperture 24 disposed at the lowermost portion of the diffuser.

A flat plate 32 having a centrally disposed aperture 34 therein, and being of slightly larger diameter than curved disc 28, and the outer end of diffuser 22 overlies these two members. This plate is positioned between the inner surface of the locking nut shoulder 20 and a bearing surface or shoulder 36 at the outer threaded end of the ferrule.

It will be appreciated that when the various parts of the vent of the invention are assembled in the respective positions as disclosed in FIG. 1, and the nut 18 is secured tightly on the threaded end of ferrule 12, all the individual members of the structure form a unitary structure in which there are no moving parts.

It will also be appreciated that the cone, disc, and top plate of the vent, all of which contain one or more apertures, form a maze or labyrinth which prohibits any liquid which might splash upwardly to the vent from splashing through and outwardly of the same. As will be seen from the arrows shown in FIG. 1, any liquid trying to get through the vent is forced to change its direction of flow about four times. This enforced directional flow of splashing liquid prevents any spilling or splashing through the vent. On the other hand, any air, because of its low mass, can and does get through the tortuous path occasioned by the various parts before mentioned and indicated by the arrows.

Extensive tests of the vent of this invention have been conducted under what might be regarded as severe conditions. Over and above being used in temperatures varying from exceedingly cold to exceedingly hot, there has been no evidence of freezing or gumminess of the members of the vent, and further, a tank truck substantially fully loaded has been driven many miles over uneven, bumpy and often hazardous roads, to determine how much, if any, spillage has occurred. It has been found that with even the violent sloshing of the liquid in the tank, none of it has come through the vent.

It has also been found that the vent performs very satisfactorily under pressure and vacuum conditions within the tank such as when the tank is being filled or when it is being emptied. The absence of any moving parts prohibits any likelihood of jamming or sticking. The fact that the vent is fabricated of metal, preferably stainless steel, affords assurance that no odors are retained in the vent, such as is often occasioned in plastics and rubber.

Having described a preferred embodiment of the structure, I claim:

1. A venting means for a tank adapted to contain liquids, comprising a hollow cylindrical body member secured to the tank and communicating with an opening therein, a first circular baffle member having an opening of given area centrally thereof and disposed in bearing engagement with the upper portion of the body member and extending axially into the body member, a second circular baffle member overlying said first baffle member and having an opening at least as large as the opening in said first baffle member and generally aligned with the opening in said first baffle member, a third circular baffle member having a peripheral portion disposed between said first and second baffle members, said third baffle member being spaced from said first and second baffle members intermediate said peripheral portion and having a plurality of openings offset outwardly from the generally aligned openings in the first and second baffle members with the sum of the cross-sectional areas of said plurality of openings being substantially equal to the area of the opening in the first baffle member, and means removably securing the baffle members relative to each other and to the body member.

2. A venting means for a tank adapted to contain liquids, comprising a hollow cylindrical body member secured to the tank and communicating with an opening therein, a truncated conical baffle member disposed in bearing engagement with the upper portion of the body member and extending axially into the body member and having an opening corresponding generally to the area of truncation, a circular cover member overlying said baffle member and having an opening substantially corresponding in area with the opening in said conical baffle member and generally aligned with the opening in said baffle member, a circular intermediate baffle member having a peripheral portion disposed between the conical baffle member and said cover member, said intermediate baffle member being spaced from said cover member and conical baffle member intermediate said peripheral portion and having a plurality of openings offset outwardly from the generally aligned openings in the cover member and conical baffle member with the sum of the cross-sectional areas of said plurality of openings being substantially equal to the area of each of the respective openings in the conical baffle member and cover member, and means removably securing the cover member and baffle members relative to each other and to the body member.

3. A venting means for a tank adapted to contain liquids, comprising a hollow externally threaded cylindrical body member secured to the tank and communicating with an opening therein, said body member having a tapered shoulder internally thereof and adjacent the end thereof remote from the tank opening, a truncated conical baffle member having an opening centrally thereof disposed in bearing engagement with said shoulder and extending axially into the body member, a circular generally flat baffle member overlying the conical baffle member and having an opening generally aligned with the opening in said conical baffle member, a circular concavo-convex baffle member having a peripheral portion disposed between said conical and flat baffle members and spaced therefrom intermediate said peripheral portion, said concavo-convex baffle member having a plurality of angularly spaced openings offset radially from the generally aligned openings in the flat and conical baffle members, and a threaded member removably threaded on said body member and having an inwardly disposed flange on the end thereof remote from the tank opening, said flange being adapted to engage the outer surface of the flat baffle member to secure the baffle members relative to each other and to the body member when the threaded member is drawn up to its fully assembled position.

4. The invention as set forth in claim 3 wherein the flat and conical baffle members have central openings of a given substantially equal cross-sectional area, and the sum of the cross-sectional areas of the openings in the concavo-convex baffle member are substantially equal to said given area.

References Cited in the file of this patent

UNITED STATES PATENTS

| | | |
|---|---|---|
| 995,314 | Abs | June 13, 1911 |
| 1,219,000 | High | Mar. 13, 1917 |
| 1,339,485 | Stranahan | May 11, 1920 |
| 1,996,292 | Harding et al. | Apr. 2, 1935 |
| 2,049,977 | Ross et al. | Aug. 4, 1936 |

FOREIGN PATENTS

| | | |
|---|---|---|
| 281,391 | Italy | Jan. 12, 1931 |
| 465,664 | Italy | Sept. 19, 1951 |
| 519,402 | Belgium | May 15, 1953 |